No. 619,389. Patented Feb. 14, 1899.
E. & R. CORNELY.
BEADING OR CORDING MACHINE.
(Application filed Mar. 30, 1898.)
(No Model.)
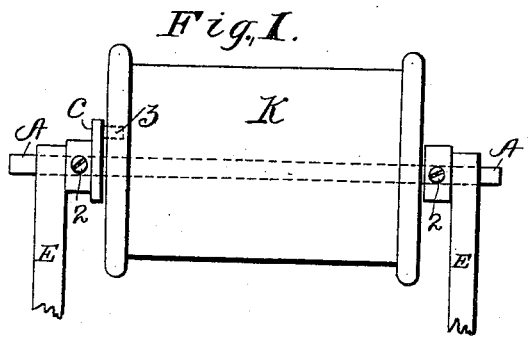
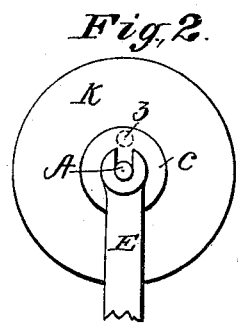
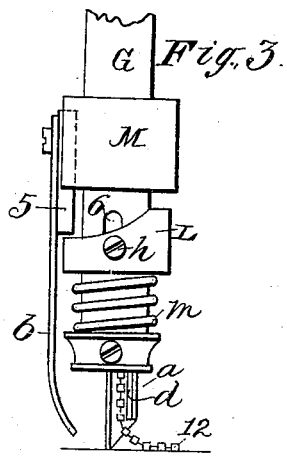
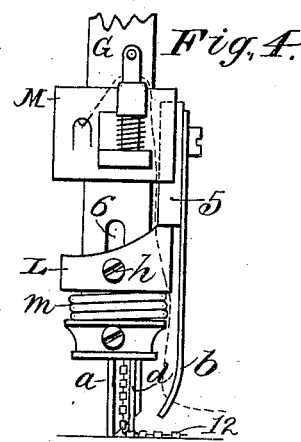
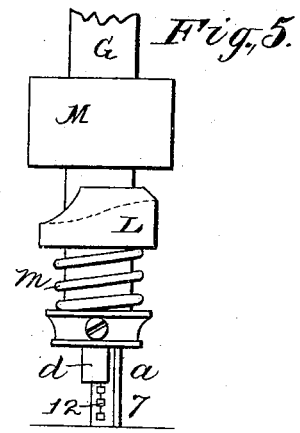
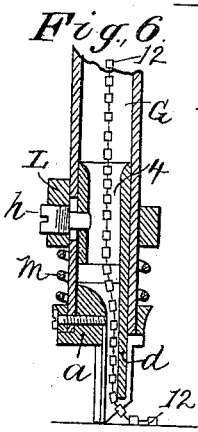
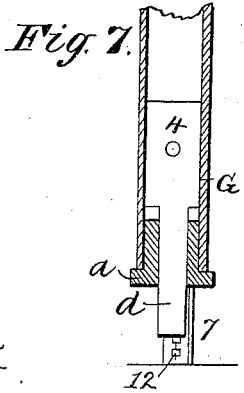
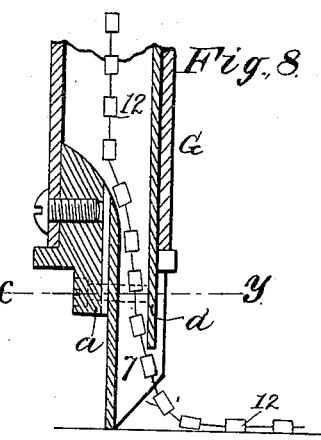
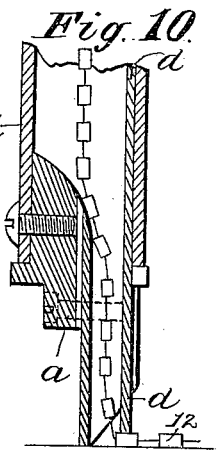
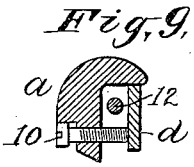
Witnesses
Inventors

UNITED STATES PATENT OFFICE.

EMILE CORNELY AND ROBERT CORNELY, OF PARIS, FRANCE.

BEADING OR CORDING MACHINE.

SPECIFICATION forming part of Letters Patent No. 619,389, dated February 14, 1899.

Application filed March 30, 1898. Serial No. 675,746. (No model.)

*To all whom it may concern:*

Be it known that we, EMILE CORNELY and ROBERT CORNELY, residents of Paris, France, have invented a new and useful Improvement in Beading or Cording Machines, which is fully set forth in the following specification.

The present invention relates to a mechanism which is adapted to be used upon beading, cording, sewing, or embroidering machines and having for its object to feed or supply automatically stringed beads, cords, or other materials through the central tube of the machine at the point where they are to be sewed upon the cloth. In existing machines the beads, cords, or other materials which are to be employed are not fed or supplied in a positive manner, but are drawn through the tube of the machine by a friction device to one side and outside of the tube or are simply drawn through the tube by the action of the feeding motion imparted to the cloth upon which the beads are sewed. The friction device is not effective with some classes of beadwork, while the cloth motion is not powerful enough for supplying a sufficient quantity of stringed beads, and the consequence is that the cloth is drawn together. These inconveniences are obviated altogether by the bead feeding or supplying mechanism herein described, which at every stitch of the machine supplies in a positive and automatic manner the exact length of cords or stringed beads required for the length of stitch.

In the accompanying drawings this feeding mechanism is shown when applied on a machine which works with a rotating thread-carrier, which winds its thread around the beads in order to secure them to the cloth; but this mechanism can also be employed in combination with any other system of beading or cording machine—such as, for instance, the machines working with an oscillating needle-bar.

We have illustrated our invention in the accompanying drawings, in which—

Figure 1 is a side elevation, and Fig. 2 an end view, of the bead or cord holding spool. Figs. 3, 4, and 5 are broken views in side elevation of the lower end of the central tube G with the feeding and other parts in operative positions. Fig. 6 is a vertical section at right angles with Fig. 3. Fig. 7 is a vertical section showing the feeder in position in the central tube G. Fig. 8 is an enlarged view showing the feeder in its raised position, and Fig. 9 is a section on line $x\,y$ of Fig. 8. Fig. 10 is an enlarged view showing the feeder down.

The stringed beads 12 descend through the tube G of the machine and pass through a guide or nipple $a$ in order to be sewed upon the cloth.

The feeding mechanism forming the object of the present invention works in the following way: Figs. 3 and 8 represent the position at the moment when the feed of the cloth is completed. The beads have been secured to the cloth at the preceding stitch and are drawn to the right of nipple $a$, and at this moment also the bead supplier or feeder $d$ has reached its highest position. Immediately after this the feeder $d$ descends and pushes the beads downward, as represented at Figs. 4 and 10, by acting upon that part of the beads which are in an inclined position in consequence of the feeding motion of the cloth, and thus the right length of cords or stringed beads are supplied for the formation of the seam. At once after this the bead-feeder $d$ rises again to its highest position for the formation of the next following stitch. This up-and-down motion of the bead-feeder $d$ can be obtained by any mechanism suitable with the special arrangement of the machine, and as an example we have in the accompanying drawings represented this motion when adapted upon a machine which works with a rotating thread-carrier $b$, which winds its thread around the beads or cords which are to be sewed upon the cloth.
In this case the sleeve M, upon which the thread-carrier $b$ is secured, receives its rotating motion from the main shaft of the machine, and the bracket 5 of the thread-carrier $b$ bears during its rotation upon the curve of a cam L, which can slide up and down upon central tube G. A screw $h$ of cam L projects through a slot 6 of tube G and penetrates into the tubular part 4 of the bead-feeder $d$, which thus moves up and down in the interior of central tube G, as represented at Fig. 6. During its rotation the thread-carrier bracket 5 presses upon cam L and pushes it downward, together with its bead-feeder $d$, while a spring m produces a counter-pressure which makes them rise at the right moment.

Fig. 9 represents a section of Fig. 8 through line x y. Nipple a is provided with a screw 10, which presses against the end of bead-feeder d, which is flexible to a certain extent, and thus the distance of said bead-feeder d from the nipple a can be regulated in order to supply more or less beads, according to the work required. Nipple a is provided with a shield, which prevents the beads from being twisted around the nipple by the rotation of the thread-carrier b. Besides this positive action of the bead-feeder d upon the beads or cords it is necessary that these materials should unwind very regularly from their bobbin, which in consequence of its weight produces a certain resistance. For this purpose bobbin K (represented in Figs. 1 and 2) does not revolve upon its shaft A, but is secured upon said shaft by means of a washer c, which is fixed upon shaft A by means of a screw 2, while a pin 3 of washer c penetrates into a hole of the flange of bobbin K, which in consequence of this arrangement cannot revolve upon its shaft, but is compelled to turn with its shaft in brackets E. Thus bobbin K unwinds in a very even and regular manner. The feeder or supplier d can also be employed for any other kind of material than beads or cords and will always produce a very regular and perfect work.

We claim—

1. In sewing and embroidering machines, the combination of the central tube, means for delivering a cord or string of beads in at the top of said tube, and positive reciprocating mechanism within the tube for advancing the cord or stringed beads in a direct and uninterrupted line through the tube to the material, substantially as described.

2. In sewing and embroidering machines, the combination of the central tube open at the top and bottom, and means for delivering stringed beads or a cord to said tube, with adjustable, reciprocating feed mechanism for advancing said stringed beads or cord in a direct line through said tube to the material, substantially as described.

3. In a sewing or embroidering machine, the combination of the central tube having a line of feed directly therethrough from end to end, and means for delivering stringed beads or a cord thereto, with a reciprocating feeding-finger at the bottom of said tube and means for reciprocating said feeding-finger, whereby a predetermined length of stringed beads or cord is delivered directly through the tube to the material at each stitch, substantially as described.

In testimony whereof we have signed this specification in the presence of two subscribing witnesses.

EMILE CORNELY.
ROBERT CORNELY.

Witnesses:
   EDWARD P. MacLEAN,
   JOHN S. ABERCROMBIE.